No. 894,846. PATENTED AUG. 4, 1908.
A. McEWAN.
PARTITION FOR INCUBATORS.
APPLICATION FILED OCT. 31, 1907.
Fig. 1.
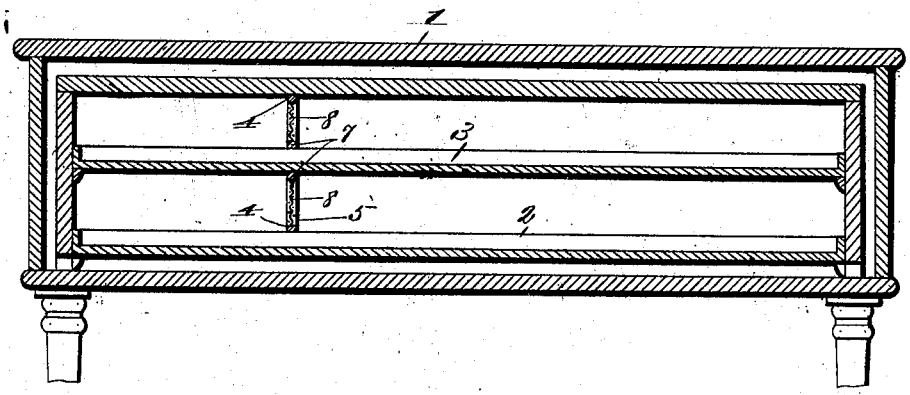
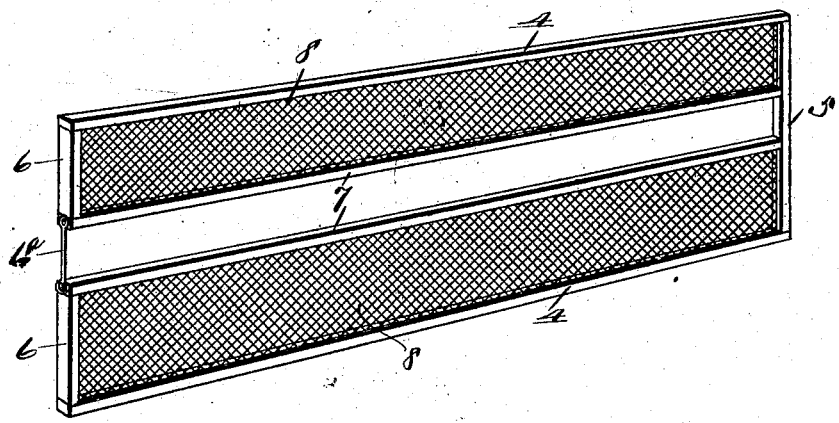
Fig. 2.
Witnesses
C. E. Smith.
E. B. McBath
Inventor
Allan McEwan.
By O'Meara & Brock
Attorneys

UNITED STATES PATENT OFFICE.

ALLAN McEWAN, OF BAY CITY, MICHIGAN.

PARTITION FOR INCUBATORS.

No. 894,846.

Specification of Letters Patent.

Patented Aug. 4, 1908.

Application filed October 31, 1907. Serial No. 400,097.

*To all whom it may concern:*

Be it known that I, ALLAN McEWAN, a citizen of the United States, residing at Bay City, in the county of Bay and State of Michigan, have invented a new and useful Improvement in Partitions for Incubators, of which the following is a specification.

This invention relates to a movable division or partition for incubator trays and the object of the invention is a partition which can be easily placed in position and which will separate one portion of the egg chamber of an incubator from another portion thereby practically converting an ordinary incubator tray into a pedigree tray, the said partition preventing chicks hatched from eggs placed upon one side of the tray passing over and becoming mixed with those hatched upon the opposite side.

By providing a movable partition which can be fitted upon any part of the tray it is possible to place within the incubator a small number of selected eggs and keep the chicks hatched therefrom separate from the chicks hatched in the larger portion of the machine without losing the use of the entire half or the entire machine as would be the case if the machine was equally divided into two sections by a fixed partition, or no means were provided for separating the chicks hatched from any particularly selected number of eggs.

The invention consists also of the features of construction hereinafter fully described, pointed out in the claims and shown in the accompanying drawings, in which, Figure 1 is a longitudinal section through an ordinary type of incubator showing a partition in place in cross section. Fig. 2 is a detail perspective view of the partition removed from the machine.

In the drawings 1 represents an incubator having a removable nursery tray or bottom 2 and an egg tray 3, and it will be, of course, understood that the incubator may be of any style and may be provided with either one or two trays.

My partition consists of two parallel side members 4 connected together at one end by an end strip 5 and provided at their opposite ends with two short end strips 6 which when the device is in position are locked together by a hook 6ª. Two inside strips 7 extend parallel to each other and to the side members 4, said strips 7 connecting the inner ends of the short end strips 6 with the continuous end strip 5. The rectangles formed between the upper side or top member 4 and the adjacent strip 7, and between the lower or bottom member 4 and its adjacent inner strip 7 are fitted with suitable screens 8. It will thus be obvious that the complete device will consist of a rectangular screen frame provided with a longitudinal center slot with a fastening device at one end. In placing the device in position, the partition is slipped across the egg tray which practically rests in the slot formed between the inner strip 7, and is locked in said position by the hook 6ª.

The upper screen 8 divides the egg chamber of the incubator into two portions, while the lower screen 8 divides the nursery into two portions. This partition therefore prevents the chicks from leaving either that part of the egg chamber or that part of the nursery which is screened off by the partition.

Having thus fully described my invention what I claim as new and desire to secure by Letters Patent, is:—

1. A removable partition for incubators, said partition being longitudinally slotted to receive an egg tray, and being adjustable upon said tray.

2. A device of the kind described comprising a partition longitudinally slotted to receive an egg tray, and a hook member carried by one end of the partition and extending across the open end of said slot.

3. A partition for incubators comprising two frames spaced apart and having parallel side members, an end member co-incident with both frames, short members at the opposite ends of said frames, the inner side members of the frames connecting the inner ends of the short members with the first mentioned end member, a hook carried by the partition and securing one short end member to the other, and screens carried respectively by said frames.

ALLAN McEWAN.

Witnesses:
J. C. HEWITT,
L. F. SCHRAMM.